United States Patent Office 3,632,493
Patented Jan. 4, 1972

3,632,493
POLYMERIC PHENONE PHOTOSENSITIZERS AND BLENDS THEREOF WITH OTHER POLYMERS
Fulton Floyd Rogers, Jr., Richmond, Va., assignor to E. I. du Pont de Nemours and Company, Wilmington, Del.
No Drawing. Filed June 23, 1969, Ser. No. 835,738
Int. Cl. B01j 1/10; C08f 29/12
U.S. Cl. 204—159.14                 5 Claims

ABSTRACT OF THE DISCLOSURE

This invention relates to improved polymeric photosensitizers for crosslinking polymers, which photosensitizers include polymeric acryloxyalkoxy and methacryloxyalkoxy substituted phenones.

BACKGROUND OF THE INVENTION

Polymeric materials, including polyethylene, polypropylene and polymers prepared from polar vinylidene monomers are widely used for a variety of industrial applications. These materials, however, commonly suffer from various deficiencies including inadequate dimensional stability and resistance to permanent stress deformation, as well as low resistance to grease, oil and organic solvents.

It is known that many of these deficiencies can be cured or substantially improved by photocrosslinking. Such crosslinking can be facilitated by the use of photosensitizers such as homopolymers and copolymers of acryloxybenzophenone, as described in U.S. Pats. 3,214,492, 3,265,772 and 3,315,013.

In the use of such sensitizers, however, still another difficulty has emerged. It is observed that upon radiation of polymer blends to achieve either crosslinking or grafting, the degree of crosslinking throughout the treated article may be ununiform. It is believed that the polymeric sensitizers described in the patent sreferred to above undergo rearrangement to form a chelated structure which is an effective ultraviolet light absorber. Consequently, in relatively thick polymeric structures, the external portions of the structure may be transformed into a light absorbing moiety, and thereby screen subsequent radiation. Thus, in thicker structures, crosslinking of interior portions may be prevented, and in thinner structures, irradiation and the resulting crosslinking may take place at a substantially lower rate than would be desirable.

SUMMARY OF THE INVENTION

The instant invention provides photosensitizers for photocrosslinking of polymeric materials which overcome the disadvantages heretofore encountered.

Specifically, the instant invention provides light sensitizing polymers of a monomer having the structural formula:

$$\text{R}-\overset{\text{O}}{\overset{\|}{\text{C}}}-\underset{}{\underset{}{\bigcirc}}-\text{O}-\text{R}_1-\text{O}-\overset{\text{O}}{\overset{\|}{\text{C}}}-\underset{\text{R}_2}{\text{C}}=\text{CH}_2$$

where R is selected from methyl and phenyl; $R_1$ is an alkylene group having 1 to 4 carbon atoms and $R_2$ is selected from hydrogen and methyl.

The instant invention further provides copolymers of from 0.01 to 10 mole percent of the above monomers with alpha olefins having from 2 to 4 carbon atoms. These copolymers, in addition to providing desirable formed structures by themselves, are particularly useful in the crosslinking of polyethylene and polypropylene, and there is accordingly also provided a crosslinked polymeric composition comprising a blend of the above copolymer and an alpha olefin selected from polyethylene and polypropylene wherein the copolymer comprises at least about from 0.1% of the blend.

The invention still further provides a crosslinked polymeric composition comprising a blend of a polymer of at least one polar vinylidene monomer having the formula $$\text{CH}_2=\underset{\text{R}^4}{\overset{\text{R}^3}{\text{C}}}$$

wherein $R^3$ is selected from one of the following groups:

$-\text{Cl}, -\text{Br}, -\text{F}, -\text{CHO}, -\text{CN}, -\text{C}_6\text{H}_5$ $$-\overset{\text{O}}{\overset{\|}{\underset{\text{OR}^5}{\text{C}}}}, -\overset{\text{O}}{\overset{\|}{\underset{\text{R}^5}{\text{C}}}}, -\text{O}-\overset{\text{O}}{\overset{\|}{\underset{\text{R}^5}{\text{C}}}}, -\text{OC}_6\text{H}_5, -\text{OR}^3$$

and $$-\text{CO}\underset{\text{R}^6}{\overset{\text{R}^5}{\text{N}}}$$

wherein $R^5$ and $R^6$ are each selected from the group consisting of alkyl and—H, $R^8$ is alkyl; and wherein $R^4$ is selected from the group consisting of $R^3$, —H and alkyl of 1 to 4 carbon atoms; and at least 0.01 mole percent of a polymer of a monomer $$\text{R}-\overset{\text{O}}{\overset{\|}{\text{C}}}-\underset{}{\underset{}{\bigcirc}}-\text{O}-\text{R}_1-\text{O}-\overset{\text{O}}{\overset{\|}{\text{C}}}-\underset{\text{R}_2}{\text{C}}=\text{CH}_2$$

wherein R, $R_1$, and $R_2$ are as defined above.

There is also provided in accordance with the instant invention a process for crosslinking and grafting polymers which comprises intimately blending the polymeric photosensitizers and the polymer to be crosslinked and thereafter exposing the blend to radiation having a wavelength of about from 2,000 to 7,000 A.

DESCRIPTION OF THE PREFERRED EMBODIMENTS

The polymeric photosensitizers of the instant invention can be prepared through separate preparation of the monomers, prior to polymerization, or can be formed by a post-reaction synthesis. When the monomers are separately prepared, the phenone can be made, for example, by conventional techniques through reaction of the corresponding hydroxyethoxyphenone with the corresponding acrylyl or methacrylyl chloride. The preformed phenone monomer can then be polymerized or copolymerized.

The polymers can be prepared by subjecting the monomers, preferably in a solvent such as hexane, benzene, toluene, or tetrachloroethylene, to a temperature of —40° to 300° C. and a pressure of 1–3000 atmospheres in the presence of a catalyst for a contact time sufficient to form the polymers, usually at least 20 seconds for a continuous process and at least 3 minutes for a batch process, and then isolating the resulting polymer. When a copolymer of an alpha olefin is desired, the polymerization can be carried out in an atmosphere of the desired comonomer, e.g., ethylene or propylene.

When high pressures are used, 800 atmospheres and above, a conventional peroxide such as di-tertiary-butyl peroxide or azo catalyst such as alpha, alpha'-azobisdicyclohexanecarbonitrile can be used and the temperature is preferably 25°–175° C.

It is believed that the essential feature of this type of catalyst, or "initiator," is that it is capable of generating free radicals. These free radical initiators, whether they be generated from a peroxide compound or from an azo-type compound combine with a polymerizable monomer to form a new free radical; the new free radical combines with another monomer molecule to form still another free radical; and this process is repeated until there is propagated a long polymer chain. Polymer chain growth terminates when the free radical-bearing polymer fragment encounters another free radical which, for example, can be another growing polymer chain or an initiator free radical.

Typical peroxides which release free radicals to function as initiators include benzoyl peroxide, di-tertiary-butyl peroxide, tertiary-butyl peracetate, di-tertiary-butyl peroxydicarbonate, 2,2-bis(tertiarybutylperoxy) butane, dimethyl dioxide, diethyl dioxide, dipropyl dioxide, propyl ether dioxide and propyl methyl dioxide. Organic hydroperoxides also applicable are, for example, tertiary-butyl-hydroperoxide, cumene hydroperoxide, ethyl hydroperoxide, and can be used to initiate polymerization of this kind. Combinations such as ammonium persulfate with a reducing agent can also be used. Typical azo compounds which decompose to liberate free radicals for initiation of polymerization include such catalysts as alpha,alpha'-azobisdicyclohexanecarbonitrile,
alpha,alpha'-azobisisobutyronitrile,
triphenylmethylazobenzene,
1,1'-azodicycloheptanecarbonitrile,
alpha,alpha'-azobisisobutyramide,
lithium azodisulfonates,
magnesium azodisulfonate,
dimethyl alpha,alpha'-azodiisobutyrate,
alpha,alpha'-azobis(alpha,gamma-dimethylvaleronitrile)

and alpha,alpha'-azobis(alpha,beta-dimethylbutyronitrile).

Coordination catalysts can also be used to effect polymerization. The term "coordination catalyst" is understood to refer to compositions that are composed of:

(A) compound containing at least one metal of the group consisting of metals of Groups IVa, Va and VIa of the Periodic Table, iron, cobalt, copper, nickel and manganese, said metal having directly attached thereto at least one substituent from the group consisting of halogen, oxygen, hydrocarbon and —O-hydrocarbon; and (B) A reducing compound selected from the group consisting of metal hydrides and compounds having a metal of Groups I, II and III of the Periodic Table, said metal being above hydrogen in the electromotive series, attached directly through a single bond to a carbon atom, said carbon atom selected from the group consisting of trigonal carbon and tetrahedral carbon.

In the above definitions, Periodic Table means Mendeleef's Periodic Table of the Elements, 25th ed., Handbook of Chemistry and Physics, published by the Chemical Rubber Publishing Co. Specific examples of compound (A) include titanium tetrachloride, titanium tetrafluoride, zirconium tetrachloride, niobium pentachloride, vanadium tetrachloride, vanadyl trichloride, tantalum pentabromide, cerium trichloride, molybdenum pentachloride, tungsten hexachloride, cobaltic chloride, ferric bromide, tetra(2-ethylhexyl)-titanate, tetrapropyl titanate, titanium oleate, octylene glycol titanate, triethanolamine titanate, tetraethyl zirconate, and tetra(chloroethyl)-zirconate. Specific examples of compound (B) include phenyl magnesium bromide, lithium aluminum tetraalkyl, aluminum trialkyl, dimethyl cadmium, and diphenyl tin.

The polymerization is preferably carried out in a solvent medium. Solvents which have been found useful in the present invention hydrocarbons and halogenated hydrocarbons such as hexane, benzene, toluene, cyclohexane, bromobenzene, chlorobenzene, o-dichlorobenzene, tetrachloroethylene, dichloromethane and 1,1,2,2-tetrachloroethane. Heterocyclic compounds such as tetrahydrofuran, thiophene and dioxane can also be used. The preferred solvents are nonpolar and aromatic solvents, e.g. benzene, hexane, cyclohexane, dioxane, etc. In some instances, copolymerization may be effected without a solvent or in an emulsion or slurry system.

The copolymers of the instant invention can also be prepared by a post-reaction of the desired hydroxyalkoxy-phenone with the acid halide of the desired alkene/acrylic acid copolymer. This method of synthesis is fully described in Blatz et al., U.S. Pat. 3,441,545, hereby incorporated by reference.

The homopolymers of the instant invention have been found to be particularly effective in enhancing the photo-crosslinking characteristics of the polymers prepared from polar vinylidene monomers described above. The photosensitizing homopolymer prepared from the phenones in accordance with the instant invention should be intimately blended with the polar vinylidene polymer. This can be accomplished by thoroughly admixing the two substances in a mixing device such as a Banbury mixer or by the dissolution of the two polymers in a solvent compatible to both materials.

The ratio of the photosensitizing homopolymer to the polar vinylidene compound should be such that the final blend is composed of at least 0.01 mole percent, preferably at least 0.1 mole percent, of the sensitizing homopolymer, the remainder being the other polymer or polymers. Less than 0.01 percent of the stabilizer does not provide sufficient sites for crosslinking or grafting in the subsequent radiation step, and more than 10 mole percent does not provide sufficient improvement to warrant the use of the relatively expensive sensitizing homopolymer.

The photosenitizing copolymers of the instant invention can be used as such to form shaped articles or they may be used in blends with other polymers, preferably polymers of alpha-olefins such as polyethylene and polypropylene. The blends should contain at least 0.1 percent by weight based on the weight of the blend, preferably 5–50 percent of the photosensitizing copolymer, and the substituted phenone units must represent at least 0.01 mole percent, preferably 0.1–10 mole percent of the blend. Blending of the copolymers of the invention with other polymers can be accomplished by any of the conventional methods, e.g. rubber milling and agitating in a liquid medium.

The copolymer and polymer blends of the instant invention can be formed into various shaped articles such as self-supporting films, laminates, coatings, filaments and tubing. The shaped article is then exposed to radiation having a wavelength of 2,000–7,000 A., preferably ultraviolet radiation of 2,000–4,000 A., for a period of time sufficient to produce crosslinking, such period being at least 0.1 second under high energy xenon radiation but usually from 5 seconds to about 30 minutes under conventional radiation means, e.g. sunlamps, sunlight and the like.

After irradiation, besides exhibiting increased strength, the shaped articles of the invention display increased modulus (stiffness), improved resistance to grease and oil, increased resistance to stress-cracking and an improvement in their high temperature properties. The shaped articles, particularly the self-supporting films, find utility in packaging applications where high oil and grease resistance is required, i.e. containers for potato chips, bacon rind, etc. The shaped articles of the invention are also useful in industrial construction; for example, as protective sheeting that is resistant to "creep." Sheets containing the copolymers that had been exposed to radiation are also useful in photoreproduction processes.

In the following examples, which further illustrate the instant invention, parts and percentages are by weight. In these examples, Melt Index is determined according to ASTM–D–1238 and dynamic zero strength temperature is determined according to ASTM–D–1430.

EXAMPLE 1

Twenty-one grams of para-hydroxyethoxybenzophenone is mixed with 11.4 grams of acrylyl chloride and the mixture is permitted to stand overnight at 70° F. An oil forms which is then dissolved in 50 ml. of benzene; the solution is extracted twice with dilute sodium hydroxide solution, once with water, and dried over anhydrous magnesium sulfate. The benzene solvent is evaporated in air; the oily residue is dissolved in 100 ml. of methanol and a product is recovered as a white mass of crystals by chilling the solution in an acetone/Dry Ice bath. The crystalline product, which melts to an oil at room temperature, is identified as acryloxyethoxybenzophenone and is used for the next step outlined below.

A copolymer of ethylene with para-acryloxyethoxybenzophenone is produced by feeding a solution of 10 grams of para-acryloxyethoxybenzophenone in one liter of benzene/cyclohexane (60/40) solvent mixture, a catalyst solution of one gram of azodicyclohexanecarbonitrile in 100 ml. of benzene and ethylene under pressure of 1000 atmospheres into a continuous reaction zone held at 165° C. A portion of the resulting copolymer collected over a period of 30 minutes contains 5.1% of para-acryloxyethoxybenzophenone by weight and has a melt index of 21.

EXAMPLE 2

The copolymer prepared in Example 1 is formed into a self-supporting film and subjected to irradiation by a 1000 watt lamp for a period of 30 seconds. The irradiated film exhibits increased resistance to grease and oil as well as increased dimensional stability, indicating that crosslinking has taken place.

EXAMPLE 3

The copolymer prepared in Example 1 (0.758 g.) is incorporated into 15 g. of polyethylene ("Alathon" 7030 [1]) in a rubber mill and then pressed into a self-supporting film having a thickness of 12 mils. A similar film is prepared as a control sample containing an equivalent amount of the copolymer of ethylene with para-acryloxybenzophenone as described in U.S. Pat. 3,214,492. Upon irradiation, the film of the instant invention shows a photosensitizing rate, as evidenced by increase in dynamic zero strength temperature, of approximately twice that of the control film.

EXAMPLE 4

Example 3 is repeated, except that the test film contains 0.2% by weight of methacryloxyethoxybenzophenone as a copolymer with ethylene and the films have a thickness of 5 mils. The control film contains a similar quantity of methacryloxybenzophenone as a copolymer with ethylene, having been prepared according to Example 1 of U.S. Pat. 3,214,492. The test film shows a zero strength temperature of 175° C. versus a value of about 135° C. for the control, upon 30 second irradiation with an ultraviolet lamp.

EXAMPLE 5

Forty grams of an ethylene/methacrylic acid copolymer having a methacrylic acid content of 10.9% by weight and a melt index of 100 is dissolved in 650 ml. of perchloroethylene by heating at reflux under a nitrogen atmosphere. To this is added 10 grams of thionyl chloride and the mixture is further refluxed with stirring for 3 hours during which approximately 50 mls. of perchloroethylene is removed. Fourteen grams of para-(beta-hydroxyethoxy) benzophenone are then added to the reactor and the reaction mixture is heated at reflux for 40 hours. The resulting product is isolated by cooling the reaction solution to room temperature and pouring it into methanol, filtering the precipitate and drying under vacuum. Forty-seven grams of products are obtained, which is identified as ethylene/methacryloxyethyoxybenzophenone copolymer.

EXAMPLE 6

The copolymer prepared in Example 5 and a control copolymer of ethylene/methacryloxybenzophenone as prepared in Example 1 of U.S. Pat. 3,214,492, are each blended with polyethylene ("Alathon" 7030) to give compositions containing 1% by weight of the photosensitizing moiety. The compositions are pressed into 13.5 mil thick films, strips of which are cut and subjected to irradiation with ultraviolet light. Dynamic zero strength temperature tests show that cross-linking occurs more rapidly in the test composition, the greatest increase occurring after about 1 minute at which time the amount of crosslinking in the test film strip is about 50% greater than in the control film strip.

EXAMPLE 7

The para-acryloxyethoxybenzophenone prepared in Example 1 is polymerized to form a homopolymer and the resulting homopolymer mixed with a solution of polyvinyl acetate substantially as illustrated in Examples 1–8 of U.S. Pat. 3,265,772.

The resulting composition is formed into a film structure and irradiated. The resulting film is substantially insoluble in benzene, indicating that photocrosslinking has taken place.

I claim:

1. A crosslinked polymeric composition comprising a blend of
   (A) an alpha olefin polymer selected from polyethylene and polypropylene, and
   (B) a copolymer of alpha olefin having from 2 to 4 carbon atoms and about from 0.01 to 10 mole percent of substituted phenone monomer having the structural formula

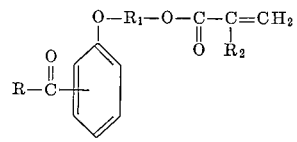

where R is selected from methyl and phenyl; $R_1$ is an alkylene group having 1 to 4 carbon atoms and $R_2$ is selected from hydrogen and methyl and wherein the copolymer comprises at least about 0.1% of the blend.

2. A process for crosslinking polymers which comprises:
   (A) intimately blending
      (1) a polymer to be crosslinked selected from the group consisting of polyethylene and polypropylene; and
      (2) at least 0.1% of light sensitizing polymer of a substituted phenone monomer having the structural formula

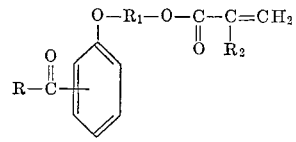

where R is selected from methyl and phenyl; $R_1$ is an alkylene group having 1 to 4 carbon atoms and $R_2$ is selected from hydrogen and methyl; and thereafter
   (B) exposing the blend to radiation having a wavelength of about 2,000 to 7,000 A.

3. A process of claim 2 wherein the radiation has a wavelength of about from 2,000 to 4,000 A.

4. A process of claim 2 wherein the polymeric blend is exposed to the radiation for a period of about from 0.1 second to about 30 minutes.

---

[1] Manufactured by E. I. du Pont de Nemours and Company.

5. A process of claim 2 wherein the light sensitizing polymer is a copolymer which comprises about from 0.01 to 10 mole percent of the substituted phenone monomer and a comonomer selected from an alpha olefin having from 2 to 4 carbon atoms.

References Cited

UNITED STATES PATENTS 3,214,492   10/1965   Tocker _____ 260—878
3,265,772   8/1966   Tocker _____ 260—898

FOREIGN PATENTS 815,086   6/1969   Canada _____ 260—897

MURRAY TILLMAN, Primary Examiner

C. SECCURO, Assistant Examiner

U.S. Cl. X.R.

204—159.2; 260—47 U, 874, 897 B, 989, 899, 900, 901